Aug. 19, 1952     T. S. SEE     2,607,108
MILLING CUTTER
Filed Feb. 10, 1948
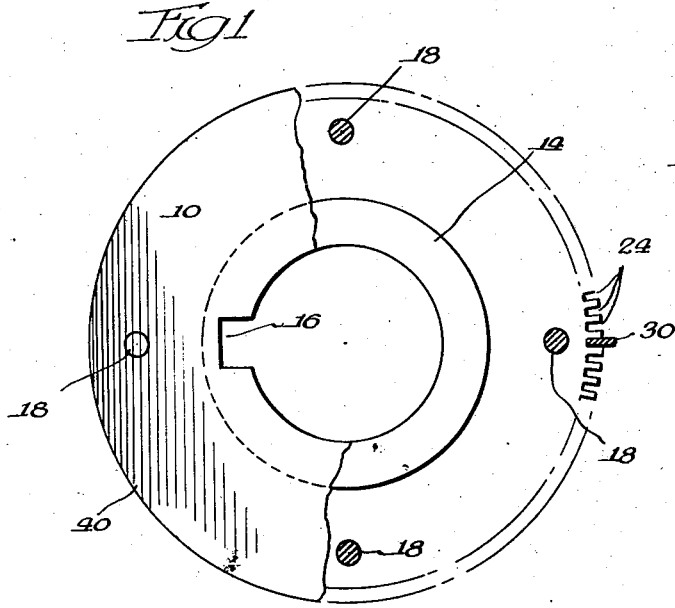
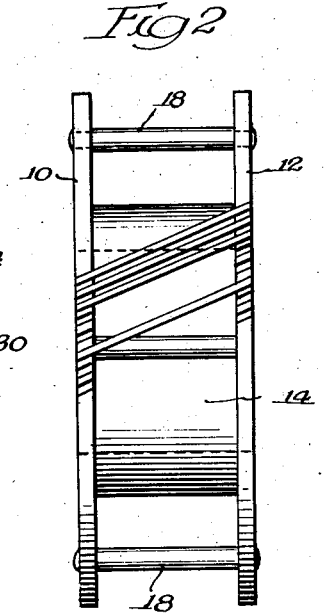
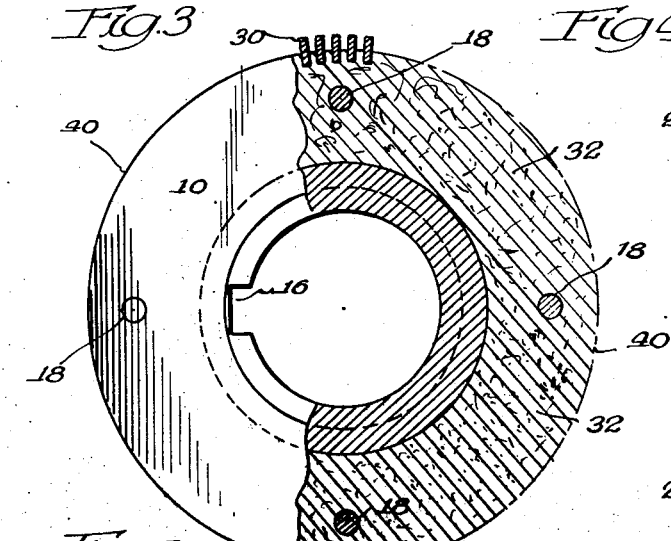
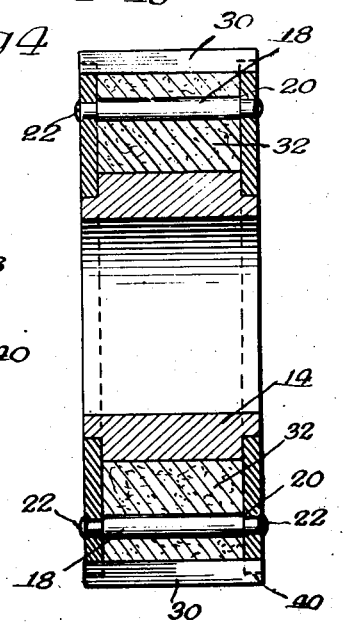
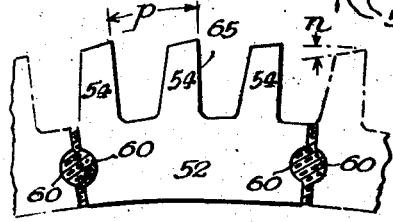
Inventor
Theodore S. See Patented Aug. 19, 1952

2,607,108

UNITED STATES PATENT OFFICE 2,607,108

MILLING CUTTER

Theodore S. See, Hammond, Ind., assignor to La Salle Steel Company, Chicago, Ill., a corporation of Delaware Application February 10, 1948, Serial No. 7,373

6 Claims. (Cl. 29—103)

This invention relates to cutters for use in milling metal articles and has for an important object thereof the provision of a new and improved cutter of a built-up construction that is durable in operation, inexpensive in construction and is capable of operating successfully, on soft metals such as lead, copper, bronze and others, as well as ferrous metals such as steel and its alloys.

It is known in the art that carbide materials such as tungsten carbide, titanium carbide and other so-called "hard metals" (usually an alloy of carbides, borides, nitrides or silicides) afford excellent cutting edges for use in the milling of metal but they are expensive and, in addition, they are sintered materials and, being such, they are subject to breakage when submitted to undue strain. With this in mind, the present invention is directed towards a new and improved built-up cutter in which only the teeth are made of these expensive carbide materials and the body of the cutter is composed of less expensive materials.

In milling steel and alloy steels the teeth of such cutters are inescapably subjected to high stresses and strains and a feature of the present invention consists in the provision of an improved cutter of this character which firmly and securely holds the carbide cutting blades in place, notwithstanding the stresses and strains to which the latter are subjected, yet permits ready replacement of a blade that becomes broken, chipped or otherwise damaged in use.

This application may be regarded as a companion to application Serial No. 7,372 filed February 10, 1948, in the name of the present inventor. The cutter disclosed herein is particularly suited and adapted for use in the milling machine shown in the companion application.

Other objects and features of the invention will become apparent from a reading of the following specification in the light of the accompanying drawings, in which, Figure 1 is a view, in front elevation, partly in section of a cutter constructed in accordance with the present invention;

Figure 2 is a view in side elevation of the cutter shown in Figure 1;

Figure 3 is a view similar to Figure 1 showing the filler material positioned within the cutter;

Figure 4 is a side view, in section, of the cutter of Figure 3, and

Figure 5 is a fragmentary view of a modified form of cutting teeth.

As shown in the drawings, the reference numerals 10, 12, indicate side or end plates of a cutter assembly and the numeral 14, a hub member which is grooved at 16 to enable it to be splined to a rotary shaft. The end plates 10 and 12 are secured to the hub 14 by welding or in some other economical manner.

In order to maintain the end plates in proper spaced relationship a plurality of spacing pins 18 are positioned at various points and as shown in Figure 4 may be provided with shoulders 20 to prevent the end plates from converging with respect to one another and with headed extremities 22 to prevent them from diverging.

From the foregoing it will be appreciated that the hub, end plates and spacing pins comprise a frame or spider that is economical and simple in design and construction and that can be fabricated in any machine shop. The assembly is provided with cutting teeth positioned in the peripheral face thereof and to this end, as shown, the end plates may be provided with indentations or recesses 24 in their outer peripheral edges for the purpose of receiving a plurality of cutter blades 30. These indentations and blades are positioned uniformly around the entire peripheral face of the cutter although, for convenience in illustration, they have not all been shown in the drawing.

For the purpose of anchoring the blades within the frame, a suitable filling material 32, such as plastic or a metal having a low melting point, fills the annular space between the hub, the end plates and the peripheral face 40 of the frame and, as will be observed from the drawing, the inner portions of the cutter blades 30 are firmly embedded or anchored in the filler 32, thereby preventing their accidental displacement during use of the cutter.

In assembling the cutter shown in the drawing, the frame is first made, the cutter blades 30, having their cutting edges properly ground are placed in the indentations 24 and the assembly is then placed in a mold. The cavity of the mold is cylindrical and the diameter of the cavity corresponds to the diameter of the finished cutter with the blades positioned therein. At this point the filler, under pressure, if desired, is introduced into the frame thus filling the mold cavity and is allowed to harden. Finally the assembly is removed from the mold and is finished by removing the surplus material from the spaces 50 (Figure 3) between adjacent cutter blades 30 and the outer peripheral faces 40 of the end plates 10 and 12.

Turning now to an inspection Figure 5, there is shown a modified form of a cutter blade in which a segmental base portion 52 is provided with a plurality of teeth 54 formed integrally therewith. For the purpose of assuring a firm anchorage of the cutter blade within the filler 32, the former may be provided with grooves or recesses 60 into which the filler 32 flows thereby further preventing accidental displacement of the cutter blade.

The shape of the cutter teeth may vary, within limits, but, as disclosed in my co-pending application referred to above, the pitch of the teeth, i. e., the distance from cutting edge to cutting edge, indicated by the letter "$p$" in Figure 5 will lie within the range of from $\frac{1}{64}$ inch to $\frac{1}{2}$ inch. The teeth themselves preferably take the form of a spiral or helical line wound about the face of the cylindrical cutter illustrated and although the angularity of the helix may vary, it will ordinarily lie between 10 and 40 degrees. Each tooth, as shown in Figure 5, may be provided with a suitable negative rake angle, indicated by the letter "$n$," on its outer face which preferably will lie between 5 and 35 degrees and with a suitable radial angle, which may be defined as the angle between the face 65 of a tooth and the radius of the cutter, and as shown in the drawing this is a zero radial angle. The provision of the negative rake angle $n$ facilitates chip removal as also does the provision of an adequate pitch $p$ between cutting edges, the important consideration being that the pitch should be reduced to a minimum while simultaneously allowing adequate space between teeth to assure proper chip disposal.

As emphasized in my co-pending application, the cutter is intended for operation on steel and alloy steels at speeds substantially in excess of those heretofore employed. Thus it is contemplated that the tooth speed, that is, linear movement of a tooth per minute, should be in excess of 1000 feet. Thus if a 4 inch diameter cutter is rotated at a speed of 1600 R. P. M., each cutting edge will move at a linear speed of approximately 1600 feet per minute, in conformity with the milling development of which this and my co-pending application comprise a part.

A typical milling operation which can be performed by the cutter shown may be described as follows: a cutter provided with carbide cutting teeth, driven at an R. P. M. of approximately 1500 and having a diameter of approximately 4 inches mills a flat bar to a depth of approximately $\frac{3}{32}$ of an inch. The bar flat during this operation is fed at a rate of 600 inches, or 50 feet, per minute and approximately 18 cubic inches of metal is thereby removed per minute. This operation can be performed with a four inch cutter, having a $\frac{1}{4}$ inch pitch and a $22\frac{1}{2}$ degree helix, on cast iron having a Brinell hardness of 200 or steel of the grade C1020 having a Brinell hardness of 180. It is to be understood that the helical angle of the cutting teeth may vary, but ordinarily it will lie within the range of from 10 degrees to 30 degrees. The teeth themselves may have a 0 degree radial angle and the cutting extremities thereof may be provided with a desired negative angle such as 10 degrees.

Having thus described the invention, what I claim as new and desire to secure by Letters Patent of the United States is:

1. A milling cutter of the character described comprising, in combination, a body portion including a hub and spaced end plates at the opposite ends of the hub, cutting blades mounted in the outer edges of the end plates and extending across the space therebetween and a filler material disposed between the end plates, said filler material having anchoring engagement with the cutting blades.

2. A milling cutter of the character described comprising, in combination, a hub, a plurality of circular end plates welded to the opposite ends of the hub and having notches formed in the circumferential edges thereof, a plurality of carbide cutting blades mounted in said notches, and a filler material disposed between the end plates, said filler material having anchoring engagement with the carbide cutting blades.

3. A milling cutter of the character described comprising, in combination, a hub, a plurality of circular end plates welded to the opposite ends of the hub and having notches formed in the circumferential edges thereof, a plurality of carbide cutting blades mounted in said notches, said notches being spaced to provide a blade pitch not greater than one-half inch and a filler material disposed between the end plates, said filler material having anchoring engagement with the carbide cutting blades.

4. A milling cutter of the character described comprising, in combination, a frame, a filler material, and a plurality of cutting elements carried by the frame and adapted to be anchored thereto by means of the filler material, each of said cutting elements comprising a body portion and a plurality of cutting blades or teeth formed integrally with said body portion.

5. A milling cutter of the character described comprising, in combination, a hub, separately constructed end plates secured to the opposite ends of the hub, cutting blades mounted in the outer edges of the end plates and a filler material disposed between the end plates, said filler material having anchoring engagement with the cutting blades, the pitch of said cutting blades lying within the range of from $\frac{1}{64}$ inch to $\frac{1}{2}$ inch.

6. A milling cutter of the character described comprising, in combination, a body portion including a hub and spaced end plates at the opposite ends of the hub, cutting blades mounted in the outer edges of the end plates and extending across the space therebetween, said cutting blades having a pitch not greater than one-half inch, and a filler material disposed between the end plates, said filler material having anchoring engagement with the cutting blades.

THEODORE S. SEE.

REFERENCES CITED

The following references are of record in the file of this patent:

UNITED STATES PATENTS

| Number | Name | Date |
|---|---|---|
| 1,532,040 | Conradson | Mar. 31, 1925 |
| 1,547,839 | Steenstrup | July 18, 1925 |
| 1,657,063 | Brown | Jan. 24, 1928 |
| 1,866,602 | Ridgeway | June 12, 1932 |
| 2,357,088 | Curtis | Aug. 29, 1944 |
| 2,390,351 | Bolton | Dec. 4, 1945 |

FOREIGN PATENTS

| Number | Country | Date |
|---|---|---|
| 2,663 | Great Britain | Feb. 5, 1896 |
| 135,802 | Great Britain | Dec. 4, 1919 |
| 661,987 | Germany | July 1, 1938 |